No. 7,778. H. BALL. BAKE OVEN. PATENTED NOV. 19, 1850.

UNITED STATES PATENT OFFICE.

HOSEA BALL, OF PHILADELPHIA, PENNSYLVANIA.

BAKE-OVEN.

Specification of Letters Patent No. 7,778, dated November 19, 1850.

*To all whom it may concern:*

Be it known that I, HOSEA BALL, of Philadelphia, in the county of Philadelphia and State of Pennsylvania, have invented certain new and useful Improvements in Bake-Ovens for Baking Bread, Biscuit, and other Articles; and I do hereby declare the following to be a full and exact description thereof, reference being had to the annexed drawings of the same, making part of this specification.

Figure 1:
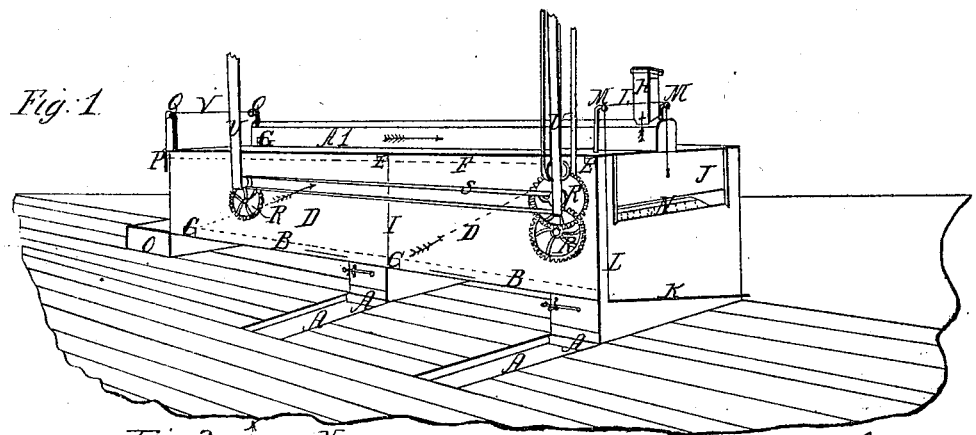
Figure 2:
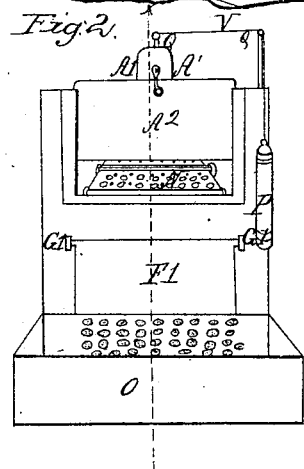
Figure 3:
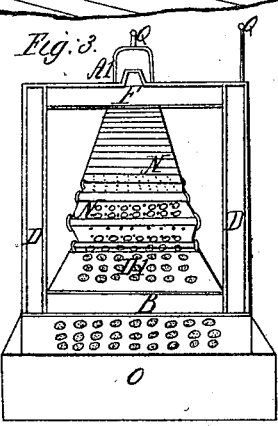
Figure 4:
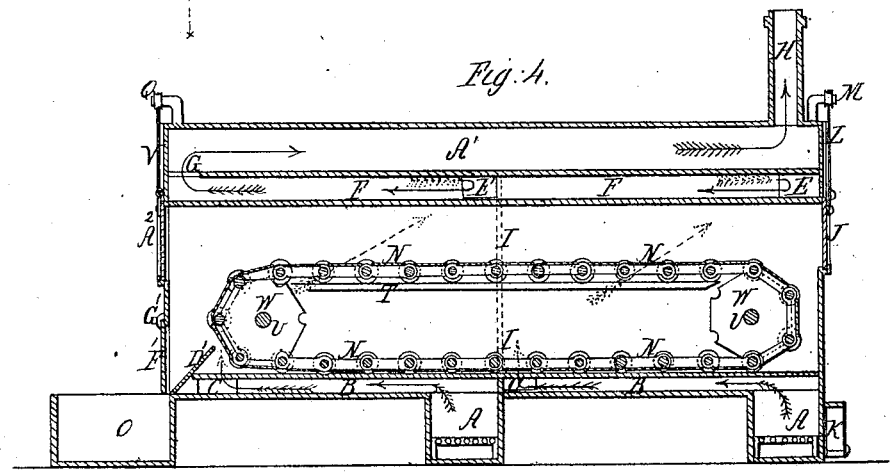

Figure 1 is a perspective view of the bake oven, looking toward the front end. Fig. 2 is an end view—rear end. Fig. 3 is an interior rear end view. Fig. 4 is a vertical longitudinal section on the dotted line $x$ $x$ of Fig. 2, showing more clearly the endless chain platform upon which the articles to be baked are placed, and the polygonal carrying plates around which it is passed, and the interior of the oven in which it revolves, and the furnaces and flues through which the smoke passes.

The same letters on the several figures refer to same parts.

The heat passes in the direction indicated by the arrows.

A—furnaces. B—bottom flues. C—passages from bottom flues to side flues D, Fig. 3. E—passages from side flues D, to the top flue F, see Fig. 4. G—passage from the top flue F, to the conductor A' which carries the flame and smoke to the chimney H. I—partition separating the side flues D. These flues and passages are arranged the same on either side of the oven.

J is the door at which the bread to be baked is introduced, made of metal, and made to slide vertically in grooves on either side of the opening in the end of the oven, and opened when desired by means of a treadle K, to which it is attached by a cord L, passing over two pulleys M, M, by which it is rendered self closing. The especial use of this door J, and its treadle K is to permit the attendant to have the use of both hands while placing the articles to be baked upon the endless platform, and allow the door to close instantly by its own gravity to prevent the escape of the heat, (it being heavier than the treadle)—thus the attendant places his foot upon the treadle K, and the door J, will be opened, and after the articles are placed on the endless platform the treadle is relieved and the door immediately descends to close the opening and thus confine the heat in the oven.

N is the endless chain platform upon which the articles to be baken are placed, formed with rods at each joint, with wheels on the ends thereof, which run on tracks or ways T, projecting inwardly from either side of the oven; the plates upon which the bread, cakes &c are placed, are made of thin sheets of metal perforated with numerous holes, and placed parallel to each other, and connected to the connecting rods, and constituting the endless chain platform, which passes around and revolves with the polygonal plates W, W, secured on the ends of horizontal transverse shafts V, V, turning in bearings in the sides of the oven.

O is a box or receptacle, into which the bread is discharged from the endless platform after being baked.

F' is a self opening and closing door, suspended by two ears G' G' at the discharging end of the oven, to permit the discharge of the baked bread into the receiver O. The bread when baked is dropped from the end of the endless platform upon the inclined conducting plate D' and lodging against the pendent door F' presses it open by the descent of the bread, and allows it to drop into the receiver, when the door instantly assumes its vertical position closing the opening and confining the heat.

$A^2$ is another door composed of metal and made to move vertically in grooves, arranged directly above the pendent door F'— and is for the purpose of allowing the attendant to remove such baked articles as are not desired to be discharged into the receiver O. This door is provided with a cord V, passed over pulleys Q, Q, and having attached to its end a balance weight P, for holding the door open until the articles are removed by hand or otherwise. S is an endless band passed around pulleys on the ends of the shafts V, V, of the polygonal carrying plates W. When one of these pulleys is turned the other will also turn by means of the endless band S, and of course the endless chain platform N, will be moved. Other gearing and power may be applied for moving the platform at intervals or continuously as preferred.

Having thus fully described the construction of my oven, I will now proceed to describe the operation of the same. The fire is placed in the furnaces A—and when the oven has acquired sufficient heat the endless chain platform N is put in motion; and by placing the foot on the treadle K, the door J will be raised, and the bread, cakes, or other articles to be baked are placed on the perforated plates of the endless platform until it is filled, when by removing the foot from the treadle K, the door J, will close by its gravity, thereby giving the attendant the use of both hands and keeping the door open no longer than is necessary to place the bread in the oven. When the bread is baked the platform is moved forward, and the bread discharged therefrom through the pendent door F' without further attention.

The walls and partitions of the oven are made of the usual material for similar purposes. This oven may be used for kiln drying grain and other similar purposes.

Having thus fully described the construction and operation of my improvements in bake ovens, what I claim therein as new and of my invention and desire to secure by Letters Patent, is—

The combination and arrangement of an endless chain platform N with the oven, by which arrangement the unbaked bread or other articles being put in at one end, are discharged at the opposite end completely baked; and in combination therewith, I claim the self opening and closing door F' arranged substantially as herein set forth.

In testimony whereof I have hereunto signed my name before two subscribing witnesses.

HOSEA BALL.

Witnesses:
Wm. Bullock,
J. P. Murphy.